Dec. 30, 1969
F. RECAS
3,486,469
METHOD FOR THE CONTINUOUS TREATMENT
OF CONFECTIONERY INGREDIENTS
Original Filed March 13, 1964
2 Sheets-Sheet 1
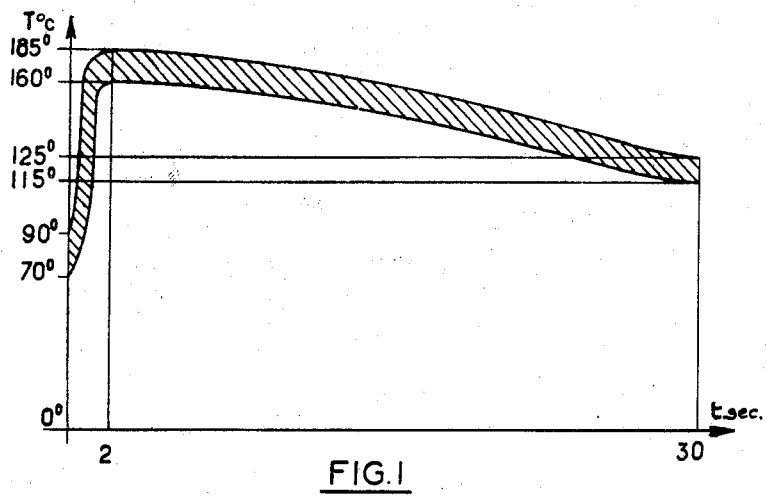
FIG.2
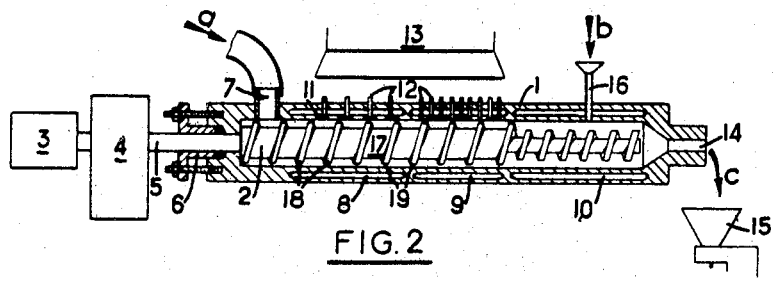
INVENTOR.
Francis Recas
BY Ernest J. Montague
   attorney United States Patent Office 3,486,469
Patented Dec. 30, 1969

3,486,469
METHOD FOR THE CONTINUOUS TREATMENT OF CONFECTIONERY INGREDIENTS
Francis Recas, Wattignies, Nord, France, assignor to Societe Anonyme Generale Alimentaire (GASA), Neuilly-sur-Seine, France, a corporation of France
Original application Mar. 13, 1964, Ser. No. 351,709, now Patent No. 3,446,136, dated May 27, 1969. Divided and this application Feb. 9, 1968, Ser. No. 704,373
Claims priority, application France, Mar. 18, 1963, 18,187
Int. Cl. A23g 3/04
U.S. Cl. 107—54     3 Claims

ABSTRACT OF THE DISCLOSURE

A method of the continuous processing of ingredients for the manufacture of boiled sugar-based confectionery comprising the steps of heat-treating a sugar-containing syrup-like mixture in the form of a thin layer of from about 1 to 2 millimeters and simultaneously subjecting this layer to a vigorous stirring action, subjecting the mixture to a rapid rise in temperature to between about 160° C. to 185° C. over a limited time period of from 4 to 5 seconds to avoid inversion, browning and crystallization of the mixture and thereby eliminating water therefrom, subjecting the heat treated mixture immediately to a cooling operation, optionally adding further ingredients during the cooling operation and thereafter delivering the product for further manipulation.

---

This is a division of my copending patent application, Ser. No. 351,709, filed on Mar. 13, 1964, now Patent No. 3,446,136.

The present invention relates to a method for continuously processing ingredients in the manufacture of sugar confectionery, in general, by heat treatment or "boiling" and cooling of the mixed ingredients, in particular.

Heretofore in order to make confectionery of the "boiled" sugar type, the ingredients, substantially sugar, glucose and water, are melted approximately at 110° C., mixed to form a syrup and finally boiled, in particular in order to evaporate the excess water, at a maximum temperature of 150° C. for approximately 5 minutes. This operation is executed in an intermittent manner in vessels which are subjected to the action of a vacuum until approximately 30 kgms. of boiled products are obtained in present-day production conditions.

After boiling, the sugar mass is allowed to cool down to 110° C., whereupon flavorings, colorings and acids can be added.

Then the sugar mass is further cooled down on cold plates or tables.

Finally, after some time the mass is taken up again in a heated rolling and drawing apparatus to produce a rope or strand which is conveyed into a molding press or into a cutting and wrapping machine which produces the sweetmeat in its final form.

This process requires many manipulations, large apparatus occupying large workroom areas, manual work and a substantial energy consumption.

During the treatment an increasingly strong coloring of the sugar is observed. Moreover, the boiled mass obtained is very viscous and the addition of ingredients (acids, flavorings, colorings) and their admixture remove transparency from the mass; the sweets thus obtained may leave a dry and rough impression in the mouth.

In the manufacture of caramel the various ingredients (sugar, glucose, milk, vegetable fat or butter, etc.) are introduced into a mixer and boiling takes place for a period of from 20 to 40 minutes during which the temperature is progressively increased to approximately 120° C.

Afterwards, the mass is cooled again on plates or tables which are internally water cooled. From there it is introduced into the rolling and drawing apparatus, then into the cutting and wrapping machine.

In the manufacture of sweets of the class known as "gums" the operations for treating sugar, glucose and gelatin are similar.

These processes are discontinuous and have disadvantages which are inherent in this kind of manufacture, these being in particular labor costs, manufacturing irregularities and above all manipulations which can only be disadvantageous for the quality of the product.

On the other hand, there exists for other articles numerous machines for continuous manufacture comprising a feed screw conveying the products in a lined cylinder in which the necessary temperature conditions are realized.

It is one object of the present invention to provide a method for improving the processing of the starting materials which avoids the above-mentioned disadvantages and enables in particular improved transparency and superior taste of the final product to be obtained by a continuous process.

It is another object of the present invention to provide a process for continuous operation comprising the steps of
(a) Cooking in a thin layer of the order of 1–2 millimeters associated with vigorous and fast stirring of the layer;
(b) Effecting a very quick temperature rise of the syrup layer from an initial temperature of between 70° C. and 90° C. to the treatment temperature in a period of less than one second;
(c) A short term treatment at a higher temperature than the normally permissible temperature at which inversion, browning or crystallization reactions would be expected, which reactions, however, do not occur, and dehydration being simultaneously promoted by appropriate means during said treatment and
(d) Rapid cooling during which additional ingredients, colorings and flavorings are incorporated, followed by shaping the final product.

This method may involve a treatment for 4 seconds at approximately 170° to 185° C. during which the removal of water vapor is assisted by appropriate means.

It is still another object of the present invention to provide a process for the continuous preparation of caramel or "gums" by a treatment for 8 to 10 seconds at approximately 115° to 120° C. during which the removal of water vapor is assisted by appropriate means.

With these and other objects in view which will become apparent in the following detailed description, the present invention will be clearly understood in connection with the accompanying drawings, in which:

FIGURE 1 is a graph showing the cooking and cooling temperature of sugar as a function of time for a process according to the present invention;

FIG. 2 is a diagrammatic section through an apparatus according to the invention for performing the boiling and cooling of the sugar;

FIG. 3 is a graph showing the distribution of temperatures in the apparatus of FIG. 2;

Figure 4:
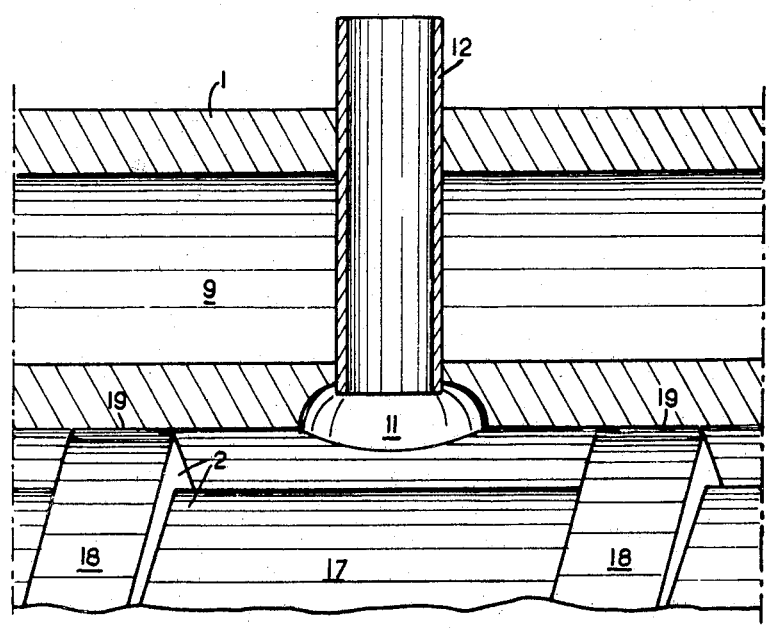
FIG. 4 is an enlarged fragmentary view in detail of the heating zone in the cylinder wall of the apparatus of FIG. 2, showing how the removal of vapor is effected.
Figure 5:
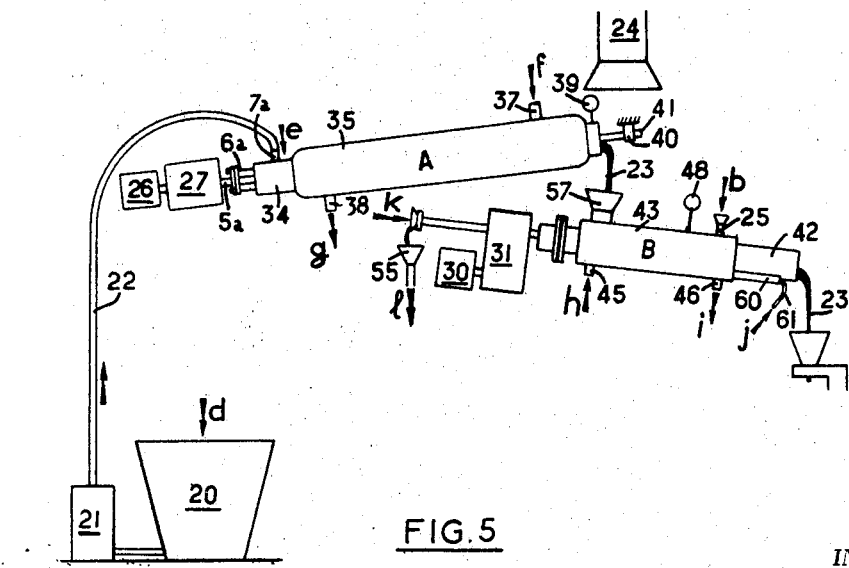
FIG. 5 is a diagrammatic view of another embodiment of an apparatus for performing the present invention.

Referring now to the drawings, and in particular to FIGS. 2 and 5, a complete installation according to the present invention serves for the manufacture of sweets of the type where the sugar is subjected to a high temperature, generally referred to as "boiling." In the manufacture of toffees and caramel the treatment temperature is lower than when hard products such as those known as "boiled sweets" are required, and the cooling device is superfluous; only the heating device is used.

In the most complete version of the apparatus for manufacturing this class of sweets the starting point is a mixture of sugar, glucose and water in the form of a syrup at a temperature between 70° and 90° C. (FIG. 1), which is heated while being stirred, to approximately 160° to 185° C. for 4 to 5 seconds in a layer having a thickness of at most one or two millimeters, whereby dehydration is promoted at the same time. The treated sugar is then quickly cooled to approximately 120° C., at which temperature flavorings, colorings and acids may be incorporated therein without danger of inversion; this incorporation is assisted by additional stirring. Finally, at approximately 110° C. the paste is cast directly into molds in which the sweets are cooled before wrapping, or it is cooled to 80° to 90° for feeding to a machine.

When heat treatment is effected in a thin layer with stirring, the product is very homogeneous. This, together with the speed of the operation avoids any browning or inversion of the sugar mass which sets in generally at about 150° C. The high temperature avoids the need for evaporation in a vacuum. Forming a thin layer and stirring assist in the removal of water vapor.

The result is a highly transparent boiled sugar sweet substantially free of air bubbles. The sweetmeat is more acceptable to the palate than the traditional sweet; it is smoother, more bland, less rough and its flavor is released better.

In order to perform this method an apparatus may be used which is illustrated in FIG. 2, or the assembly of an apparatus which is diagrammatically illustrated in FIG. 5.

Referring now again to the drawings, and more particularly to FIG. 2, a hollow horizontal cylinder 1 is provided with a screw 2 driven by a motor 3 through a speed reduction gear 4 and a shaft 5. Sealing is obtained by a gland 6. The supply of ingredients or syrup is effected by a tube 7 leading, for example, to a syrup pump.

The cylinder 1 comprises in its wall thickness heating jackets 8 and 9 and cooling jackets 10. A heating fluid, for example water vapor or superheated steam under pressure, circulates in the heating jackets 8 and 9; and cold water circulates in cooling jacket 10. Decompression recesses 11 are disposed along the interior upper wall of the cylinder 1 and in the heating zone, which extend outwardly by way of conduits 12 terminating in the open atmosphere. The recesses 11 are designed to collect the vapor evaporated from the syrup which is then conducted to the outside and is removed by way of a hood 13. An outlet 14 of the cylinder 1 terminates at one end above a hopper 15. Adjacent to the outlet 14 there is provided in the cooling zone of the wall of the cylinder 1 a tube 16 which permits acids, colorings and flavorings to be introduced.

The screw 2 consists of a core 17 having a diameter which is slightly, but at least 2 mm., smaller than the internal bore of the cylinder 1, and is surrounded by a helical rib 18, the crest of which extends into the interior of the cylinder 1. The width of the helical rib 18 is small compared with the pitch of the helix formed thereby. A flat helical passage 19 is consequently provided between the core 17 of the screw 2 and the interior bore of the cylinder 1 along the whole length of the heating zone. Relative to the cooling jacket 10, the core 17 of the screw 2 has an even smaller diameter; the pitch of the screw 2 is smaller, and a helical passage is provided between the threads and the interior bore of the cylinder in order to reduce the delivery speed of the products.

The functioning of this apparatus is as follows:

The apparatus is supplied by the tube 7 with syrup at a temperature of between 70° and 90° C. (as indicated by arrow a), which is distributed between the threads of the screw 2 and the interior heated wall zone of the cylinder 1. The rotation of the screw 2 causes the syrup to proceed along this wall toward the outlet 14 in a thin layer of the order of 1–2 mm. mixing it vigorously resulting in laminar flow in the helical passage 19. Since this wall is heated, the temperature of the syrup rises rapidly and uniformly in the mass as indicated in the graphs of FIGS. 1 or 3.

Water vapor is formed and discharged into the decompression recesses 11, from which it is removed through the tubes 12 into the hood 13. The syrup attains its maximum temperature (approximately 175° C.) nearly instantaneously, and is then kept at this temperature for 4–5 seconds; it does not have enough time to invert or to brown, because it is cooled at once in the cooling zone of the cylinder 1 comprising the cooling jacket 10. At this place the temperature drops to approximately 120° C., and more particularly at the outlet 14 when it is discharged (arrow c) into an exit hopper 15. Flavoring, colorings and acids are introduced (arrow b) in the second portion of the cooling zone through the tube 16 at an instant at which there is little danger of inversion and at which the evaporation of the flavorings is reduced, but where they are still vigorously stirred into the syrup by the screw.

Beyond the exit hopper 15, the syrup is then utilized in a known manner, for example by following the cooling process in a rolling and drawing apparatus supplying a press.

The embodiment which has just been described does not allow easy adaptations of the manufacturing process. It does not permit, for example, caramels, toffees, or gums to be manufactured. It is usable only for boiled sugar. Also, for an increased flexibility of exploitation, it has been found preferable to divide the machine in two parts as shown in FIG. 5, comprising boiler A and a cooler-mixer B.

The syrup at a temperature of between 70° and 80° C. is supplied (arrow d) to a reservoir 20, from where it is pumped by a pump 21 through a tube 22 to the inlet 7a of the boiler A (arrow e). After boiling and at the instant at which it has attained its maximum temperature, the syrup passes out at the outlet of the boiler and flows via pipe 23 into a hopper 57 of the cooler-mixer B, while the steam liberated is discharged into a hood 24.

In the cooler-mixer B flavorings, colorings and acids are introduced through tube 25 (arrow b) and the difficult homogenization of the mixture with the essential oils is improved by means of agitation with compressed air introduced through a tube 61 at the lower end portion (arrow j), just before the discharge into the exit hopper 15 as before.

The screws of the boiler A and of the cooler-mixer B are driven independently by motors and variable speed reducing gears 26, 27 and 30, 31, respectively. Their speeds depend on the products to be manufactured; thus, for example, for boiled sugar sweets the screw of the boiler A revolves at approximately 500 r.p.m.

The boiler A is constituted in a similar manner as the apparatus of FIG. 2.

The cooler-mixer B is also constituted in a similar manner as the boiler A.

After the boiled syrup is introduced into the cooler-mixer B by hopper 57, it travels, while being cooled in a tube 42, moved by a screw therein, and at the end of its travel, colorings, flavorings and acids are added thereto through the tube 25 (arrow b) which, similarly to the hopper 57, is disposed in the upper cylinder wall of the apparatus. Mixing the syrup and the ingredients introduced through tube 25 is effected by the rotation of the screw which mixes all the ingredients. Mixing is further improved by arranging compressed air to bubble through the mix, the air being introduced at the lower end portion of the tube 42 through a plurality of small holes which are connected to a source of compressed air through tube 61 (arrow j).

The boiler A and the cooler-mixer B are preferably inclined to the horizontal, the former upwardly and the latter downwardly. This inclination may be variable and influences the output of the apparatus.

Thus, the boiler is generally inclined approximately 20° relatively to the horizontal, but it might be adjusted to 40° or 60°, or be simply disposed horizontally.

The independence of the controls for the two apparatus A and B enables also their outputs to be varied independently of each other, thereby facilitating control in accordance with the products to be manufactured.

The principles of functioning of the apparatus according to FIGS. 2 and 5 are equivalent; the evolution of the temperatures corresponds particularly to that indicated in FIGS. 1 and 3. The syrup is mixed in the same manner to the same consistency, and it has been found that steam is more easily released by the boiled mass when the latter is discharged into the open air at the outlet of the boiler as indicated at stream 23 in FIG. 5, and when it drops into the hopper 57 of the cooler mixer B. In this manner the syrup is sufficiently dried without necessitating evacuation of the tubes situated in the vicinity of the latter portion of the upper wall of the cooker. The heating temperature is also regulated by the thermal inertia of the core 17 (shown in FIG. 2) which has a substantial mass. Cooling is improved due to the fact that the core of the screw of the cooler-mixer B is cooled. A better homogeneity of the mixture of the syrup and the ingredients introduced at tube 25 (arrow b) is obtained because the stirring by the screw is effected simultaneously with the bubbling of compressed air injected at tube 61.

At the outlet of the cooler B the syrup is used in a known manner.

Naturally, in order to apply the process according to the present invention to the manufacture of confectionery the embodiments of the apparatus are not limited to those which have just been described. For instance, it is possible to distribute over an inclined heated wall, a thin layer of syrup, the movement of which is accelerated by means of a chain with scrapers, the heated wall being arranged adjacent to a cooled wall in such a manner that the syrup is subjected to the temperature cycle illustrated in FIG. 1. It is also possible to replace the screw by a core which is provided with helically disposed projections, or which is traversed by helical grooves. Heating of the apparatus may be effected in various ways, for example, by means of electricity, a gas or liquid fuel burner, or circulation of a heating medium, without falling outside the scope of the invention. The invention comprises, moreover, any mechanical device capable of subjecting the syrup to this cycle of temperatures in which the dehydration is promoted in the zone of maximum temperature.

So far, apparatus has been described for the manufacture of a boiled sugar confectionery where it is important to attain high temperatures. The same apparatus can serve after a small modification for the manufacture of caramel and toffee products, for which the temperatures are necessarily lower, of the order of 120° C. at most.

For such manufacture, a cooler is not used and the products are discharged immediately after boiling directly into the exit hopper 15. The boiling time is extended to approximately 10 seconds for caramel and to approximately 8 seconds for toffee, and the speed of the screw is reduced for instance to 120 r.p.m. for caramel. In comparison with the conventional manufacture, it will be noted that the boiling period is considerably reduced (approximately from 20 minutes to 10 seconds for caramel) at a similar boiling temperature; in this way any alteration of the components is avoided and the final product has an even more agreeable flavor. If required it is possible to permit the caramel or the toffee, which is fluid at the outlet of the boiler A, to cool on a table and to use it in the conventional manner in a strand twisting and drawing device; but direct casting offers numerous advantages, in particular those of obtaining soft caramels adapted to be coated subsequently, and of entirely mechanizing the manufacture, with the possibility as a consequence thereof, of increasing production, economizing in labor and avoiding handling of the product, which is prejudicial to appearance and hygiene.

These latter advantages exist equally for the manufacture of boiled sugar sweets, but in this case, compared with the conventional manufacture, perfect transparent and better tasting sweets are obtained.

In all cases the machines are much smaller and less troublesome than the machines used heretofore in the manufacture of confectionary. The apparatus is light and can be high rather than wide. The floor space occupied is also smaller. Moreover, the continuous manufacturing machines according to the invention lend themselves easily to automatic control of output and temperature, and permit consequently a greater regularity of the quality of the product. It must also be noted that the manufacturing times are considerably reduced, and also that an apparatus of smaller dimensions has a much higher production than the installations existing heretofore.

The methods and the apparatus which have just been described are especially designed for the manufacture of confectionery, but they may also be adapted and employed for other uses whenever it is desirable to heat, dehydrate and very rapidly cool a liquid or viscous product in order to preserve its appearance, its taste or its qualities. This is the case in particular for numerous food products for which it has been found generally that a strong but rapid treatment preserves the flavor better than a milder but longer treatment. The process and the apparatus according to the invention permit the duration of the treatment to be divided, in many cases by factors of the order of 100. They may be applied, for example, for the concentration of juices from fruit, vegetables and similar products.

In this case it has been possible to secure remarkable results as to the flavor and appearance of the concentrated juices.

While I have disclosed several embodiments of the present invention, it is to be understood that these embodiments are given by example only and not in a limiting sense.

I claim:

1. A method for the continuous processing of ingredients for the manufacture of boiled sugar-based confectionery comprising the steps of heat-treating a sugar-containing syrup-like mixture in the form of a thin layer of from about 1 to 2 millimeters and simultaneously subjecting this layer to a vigorous stirring action, rapidly raising the temperature of said mixture to between about 160° C. to 185° C. in a period of less than about 2 seconds, subjecting said mixture to said temperature of between about 160° C. to 185° C. over a limited time period of from about 4 to 5 seconds to avoid inversion, browning and crystallization of the mixture and thereby eliminating water therefrom, subjecting the heat treated mixture immediately to a cooling operation, and thereafter delivering the product for further manipulation.

2. The method for the continuous processing of ingredients for the manufacture of boiled sugar-based confectionery comprising the steps of heat-treating a sugar-containing syrup-like mixture in the form of a thin layer of from about 1 to 2 millimeters and simultaneously subjecting this layer to a vigorous stirring action, subjecting said mixture to a rapid rise in temperature to between about 160° C. to 185° C. over a limited time period of from 4 to 5 seconds to avoid inversion, browning and crystallization of the mixture and thereby eliminating water therefrom, subjecting the heat treated mixture immediately to a cooling operation, and thereafter delivering the product for further manipulation, the mixture is caused to pass through an annular space having a radial dimension of not more than about two millimeters, the outer wall of said annular space being provided by a heated hollow cylinder, while the inner wall is provided by a rotating surface having a helical worm-like rib on its periphery, to raise the temperature of the mixture from about 70°–90° C. to the treatment temperature of 160° to 185° C. over a period of time not exceeding one second.

3. The method for the continuous processing of ingredients for the manufacture of boiled sugar-based confectionery comprising the steps of heat-treating a sugar-containing syrup-like mixture in the form of a thin layer of from about 1 to 2 millimeters and simultaneously subjecting this layer to a vigorous stirring action, subjecting said mixture to a rapid rise in temperature to between about 160° C. to 185° C. over a limited time period of from 4 to 5 seconds to avoid inversion, browning and crystallization of the mixture and thereby eliminating water therefrom, subjecting the heat treated mixture immediately to a cooling operation, and thereafter delivering the product for further manipulation, continuously introducing said sugar-containing syrup-like mixture into a continuous treatment vessel including a heating zone and a cooling zone, said vessel being provided with a cylindrical bore, causing the mixture to travel progressively through an annular space within said bore and through said heating zone and cooling zone in that order with a continuous and progressive feed action to eliminate said water from said mixture in said heating zone by said rapid rise in temperature of said mixture, followed by said cooling operation in said cooling zone and delivering the mixed product from said cooling zone for further manipulation.

References Cited

UNITED STATES PATENTS

| 2,507,477 | 5/1950 | MacDonald et al. | |
| 2,835,589 | 5/1958 | Whitefield | 99—134 |
| 2,995,450 | 8/1961 | Leach | 99—134 |

WALTER A. SCHEEL, Primary Examiner

ROBERT I. SMITH, Assistant Examiner

U.S. Cl. X.R.

99—134